C. REISS.
INCANDESCENT LAMP.
APPLICATION FILED OCT. 13, 1911.
1,072,993.
Patented Sept. 9, 1913.
2 SHEETS—SHEET 1.
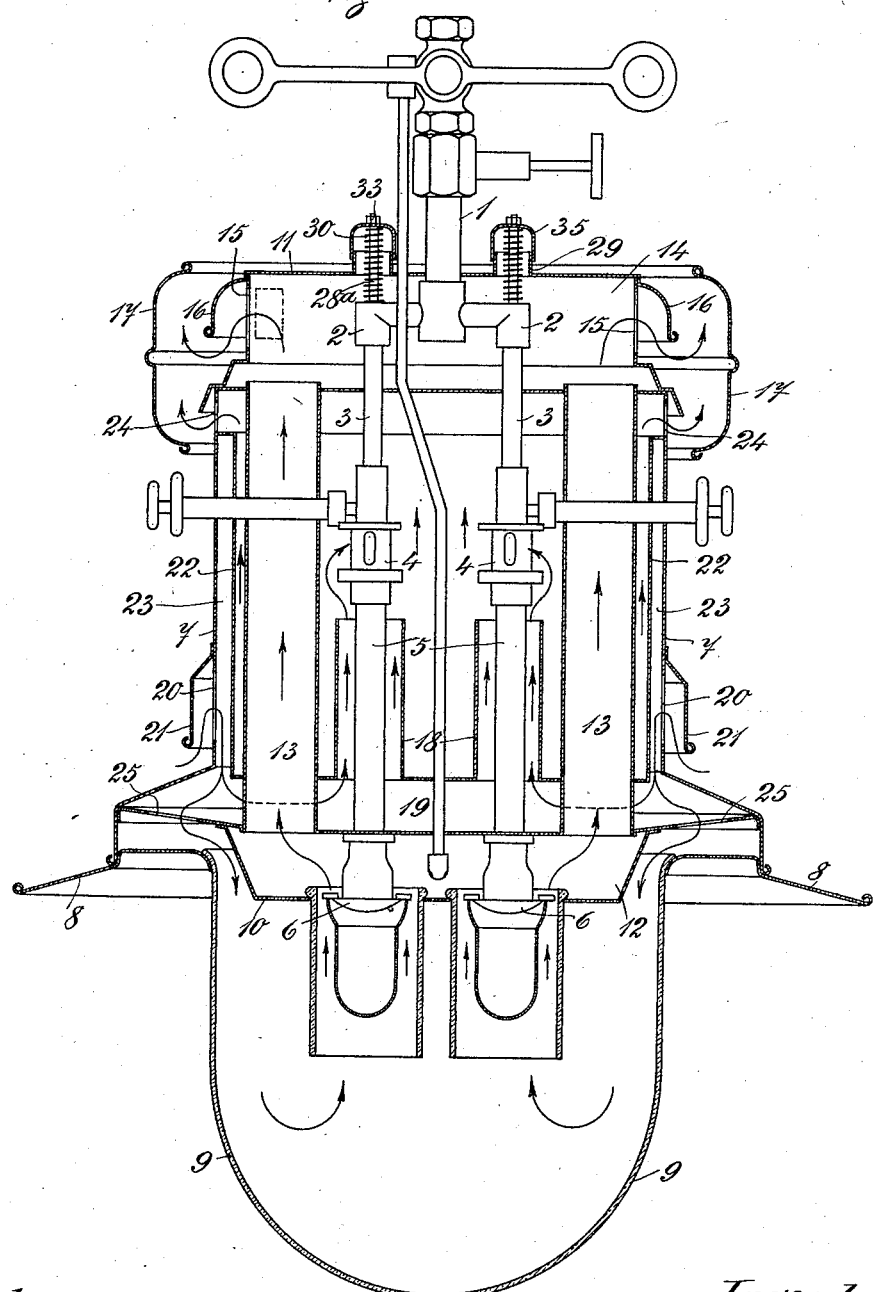
Witnesses:
L. Hoskinson
C. D. Brown.
Inventor:
Carl Reiss.
by
Foster Freeman Watson & Coit
Attorney.

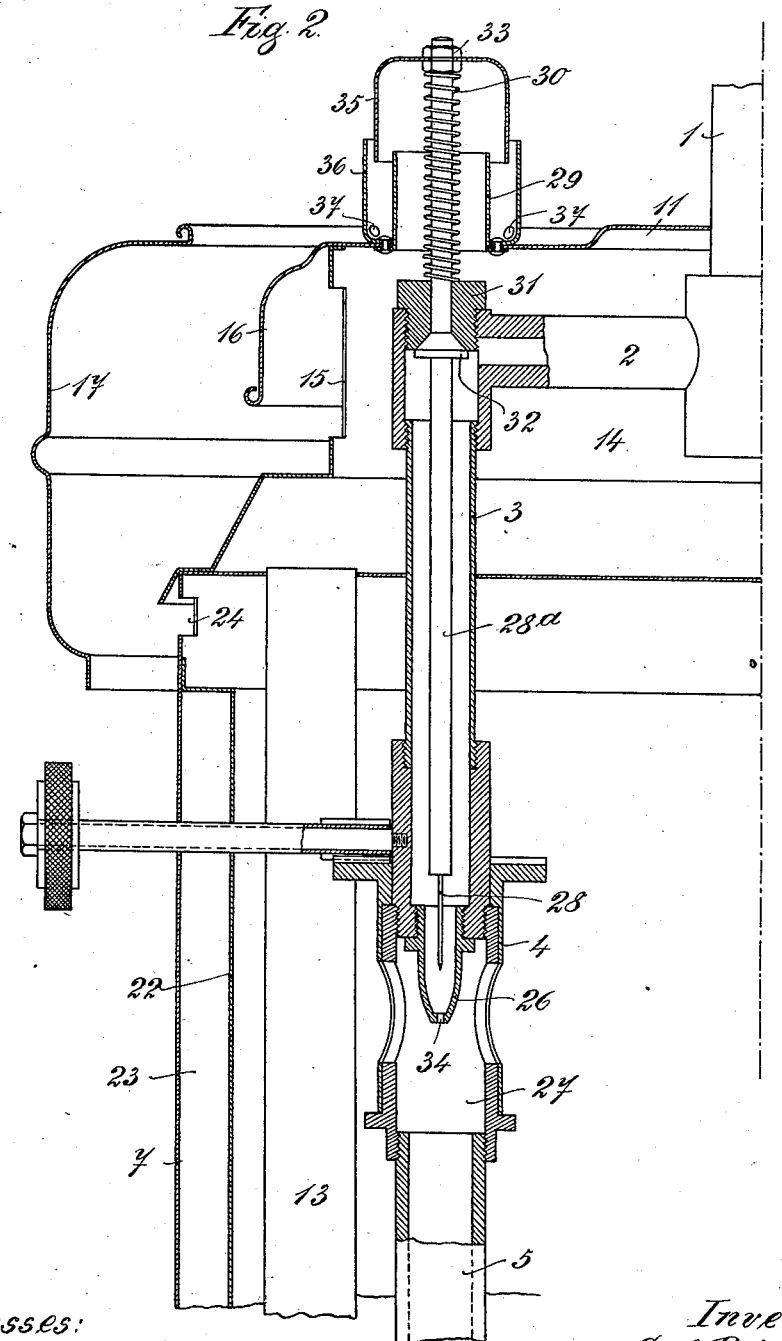

UNITED STATES PATENT OFFICE.

CARL REISS, OF BERLIN, GERMANY.

INCANDESCENT LAMP.

1,072,993.

Specification of Letters Patent.

Patented Sept. 9, 1913.

Application filed October 13, 1911. Serial No. 654,528.

*To all whom it may concern:*

Be it known that I, CARL REISS, a subject of the King of Prussia, German Emperor, and resident of 37–38 Warschauerstrasse, Berlin, Germany, have invented certain new and useful Improvements in Incandescent Lamps, of which the following is a specification.

This invention relates to certain improvements in incandescent lamps, particularly of the inverted burner type.

My invention has for its object to provide improved means for circulating primary air through the lamp which at the same time cools the burner tubes and prevents expansion of the gaseous mixture before reaching the burner, the air being slightly preheated before reaching the burner tubes.

My invention has also for its object to provide means for retaining the heat in the interior of the lamp so as to fully utilize the hot gases from the burners for heating the primary air.

A further object of the invention is to provide means for readily and rapidly cleaning the nozzle, said means being manipulated from the exterior of the lamp.

According to this invention the means for circulating and preheating the primary air comprises an open tube around the burner tube, air being supplied to the surrounding tube from the exterior of the lamp, and said air being heated on its way to the mixing chamber by the hot gases from the burner. The air rising in the tube surrounding the burner tube thus serves to cool the burner tube and prevent excessive heating of the same and consequent expansion of the gaseous mixture before reaching the burner. Part of the air thereupon enters the mixing chamber of the burner tube while the remainder escapes through openings in the upper part of the lamp casing. I also surround the interior of the lamp with an insulating jacket or double walled casing so that the radiation of heat from the interior of the lamp is minimized.

A further improvement consists in the provision of a cleaning-needle which passes from the exterior of the lamp through the union connecting the service pipe to the nozzle and is adapted to be manipulated to pass through the orifice of the nozzle and thus remove any foreign matter therein.

To prevent the escape of gas between the cleaning needle and the parts of the lamp casing and union through which it passes, the needle carries a suitable valve which is maintained closed when the needle is not manipulated and, to prevent the entry of rain, snow or the like, a suitable protecting cap or hood is provided on the exterior end of the needle.

In order that the invention may be more clearly understood, reference is made to the acompanying drawings, whereon—

Figure 1 shows, in vertical section, an inverted incandescent gas lamp constructed according to my invention. Fig. 2 is a detail sectional view showing the cleaning needle and adjacent parts.

1 designates the gas service pipe opening into the unions 2 from which depend the gas pipes 3 carrying the gas nozzles 26 which are located within the mixing chamber 27, the latter being surrounded by an adjustable casing 4. Beneath the gas nozzle 26 is arranged the burner tube 5 carrying the usual burner 6. The lamp is inclosed within an outer casing 7 supporting the reflector 8 and the lamp globe 9, the lamp casing 7 being closed below by means of an internal reflector 10 and above by means of a cover 11. The gases from the burner 6 rise through apertures in the reflector 10 into a chamber 12 into which open vertical tubes 13 which terminate at their upper end in a chamber 14 communicating with the outer atmosphere through apertures 15 which are provided with wind guards 16 and 17. Surrounding each of the burner tubes 5 is a tube 18 open at both ends, the lower end of said tube 18 communicating with a space 19 and from thence with the outer atmosphere through apertures 20 in the outer casing 7, said apertures being provided with wind guards 21. Within the outer casing 7 is arranged a cylindrical inner casing 22 so that the space 23 is closed at its upper end and opens into the apertures 20 at its lower end. Apertures 24 are provided in the outer casing 7 and above the space 23.

From the foregoing description it will be readily understood that the path of the air and gases is as follows:—Air for combustion enters the lamp by way of the apertures 20, part of the air passing around the tubes 13 into the space 19 while the remaining air passes through apertures 25 into the globe and serves for creating combustion at the burner 6. The air in the space 19 which has been primarily heated on its passage around the tubes 13 rises in the tubes 18 and is then supplied to the mixing chamber 4. The air not required in the mixing chamber 4 rises within the lamp and escapes through the apertures 24. It will thus be seen that the air is first preheated on its way to the space 19 and then serves to prevent excessive heating of the burner tubes 5 and consequent expansion of the gaseous mixture before reaching the burner, while the primary air is directed into close proximity to the mixing chamber 4. The space 23 moreover prevents excessive radiation of heat from the interior of the lamp and thus serves to enable the heat from the hot gases in the tube 13 to be fully utilized in heating the primary air. It will also be seen that the gases rising in the tube 13 serve also to preheat the gas in the unions 2 in the upper part of the lamp.

In order to enable the nozzle 26 to be readily cleaned from the exterior of the lamp, I provide a cleaning-needle 28, as shown clearly in Fig. 2, the shank 28ª of this needle 28 being arranged to pass through a gland 31, screwed into the union 2 near its bend or elbow. The shank 28ª of the needle further passes through a socket 29, and out through the head of the lamp, this socket being secured, in any suitable manner, to the cover 11.

The cleaning-needle 28 is controlled by a helical spring 30, located in the socket 29, and the shank 28ª is advantageously provided with a coned valve 32, which normally sits in a correspondingly coned seating in the gland 31. At its uppermost end the shank 28ª of the cleaning-needle is furnished with a head or knob 33 against which the spring 30 presses. By depressing this knob or head 33 the cleaning needle 28 is depressed and passes through the orifice 34 in the gas nozzle 26 thus removing any foreign matter therefrom, and on the pressure being removed from the head or knob 33, the needle 28 returns under the action of the spring 30 to its normal position, the valve 32 closing at the same time on to its seating in the gland 31. Instead of the spring 30 other means may be employed to keep the cleaning needle 28 raised: for instance the needle may be screw-threaded or it may be operated by a lever.

In order to prevent rain, snow or hail, from entering the lamp, the exterior knob 33 carries a cap or hood 35 surrounding the needle shank 28ª and extending over the socket 29, and around the latter is arranged a hemispherical or other suitably shaped cup or receptacle 36 fixed to the cover 11, said cup being provided, near its bottom, with orifices 37, through which rain, water or thawed snow or hail may run off, thus preventing it from entering the lamp-body or casing by way of the socket 29 and gland 31, and thus preventing the parts from rust.

Said cap or hood 34 may, if deemed necessary, be partially inclosed within the hemispherical cup 36. As shown in Fig. 1 the cup 36 may, if desired, be dispensed with.

I claim:—

1. An inverted incandescent lamp, comprising a casing having air inlet openings in its lower part and separate air and hot gas outlet openings in its upper part, a vertical burner tube in said casing, carrying the burner at its lower end and connected at its upper end to the gas supply, a mixing chamber at the upper end of said burner tube, and an open primary air tube concentric with and surrounding said burner tube and to which air is supplied from said air inlet openings, entering said mixing chamber while the remainder escapes through said air outlet openings in the upper part of the lamp casing.

2. In an inverted incandescent lamp having burner tubes vertically depending from unions connected to the service pipe, open tubes surrounding the burner tubes, an air chamber below said open tubes and into which the latter open and having apertures in the lamp casing for the admission of air, a hot gas chamber below said air chamber and into which the hot gases from the burners pass, vertical hot gas flues leading from said hot gas chamber through said air chamber into the upper part of the lamp, and a chamber in the top part of the lamp into which said flues open and which incloses said unions, said upper chamber having outlet apertures in the lamp casing for the escape of the hot gases.

3. In an incandescent lamp having means for heating the primary air by the hot gases in the lamp casing, insulating means comprising a wall within and concentric with the lamp casing, and having an outwardly projecting upper flange to form a space between said lamp casing and wall closed at its upper end but communicating below with the outer atmosphere through air inlet openings in the lamp casing.

4. In an inverted incandescent lamp having burner tubes vertically depending from unions connected to the service pipe, open tubes surrounding the burner tubes, an air chamber below said open tubes and into which the latter open and having apertures in the lamp casing for the admission of air, a hot gas chamber below said air chamber and into which the hot gases from the burners pass, vertical hot gas flues leading from said hot gas chamber through said air chamber into the upper part of the lamp, a chamber in the top part of the lamp into which said flues open and which incloses said unions, said upper chamber having outlet apertures in the lamp casing for the escape of the hot gases, and a cylindrical wall concentric with and within the lamp casing and turned-in at its upper end somewhat below said upper chamber, so as to inclose a space between said wall and lamp casing, which space communicates below with said air chamber.

5. In an inverted incandescent lamp having burner tubes vertically depending from unions connected to the service pipe, open tubes surrounding the burner tubes, an air chamber below said open tubes and into which the latter open and having apertures in the lamp casing for the admission of air, a hot gas chamber below said air chamber and into which the hot gases from the burners pass, vertical hot gas flues leading from said hot gas chamber through said air chamber into the upper part of the lamp, a chamber in the top part of the lamp into which said flues open and which incloses said unions, said upper chamber having outlet apertures in the lamp casing for the escape of the hot gases and a cylindrical wall concentric with and within the lamp casing and turned-in at its upper end somewhat below said upper chamber, so as to inclose a space between said wall and lamp casing, which space communicates below with said air chamber, and said lamp casing having apertures intermediate said space and said upper chamber for the escape of excess heated air.

6. In an inverted incandescent lamp having a burner tube and nozzle depending vertically from a union connected with the service pipe, a needle passing through the union to the nozzle, means operatable from above the lamp to cause said needle to pass through the nozzle orifice, and a weather protecting hood on the exterior end of said needle.

7. In an inverted incandescent lamp having a burner tube and nozzle depending vertically from a union connected with the service pipe, a needle passing through the union to the nozzle, means operatable from above the lamp to cause said needle to pass through the nozzle orifice, a weather protecting hood on the exterior end of said needle and a cup mounted on the top of the lamp and concentric with said hood and having drainage apertures near the bottom thereof.

In witness whereof I have hereunto set my hand in the presence of two witnesses.

CARL REISS.

Witnesses:
 WOLDEMAR HAUPT,
 HENRY HASPER.

Copies of this patent may be obtained for five cents each, by addressing the "Commissioner of Patents, Washington, D. C."